US011862851B2

(12) United States Patent
Chan et al.

(10) Patent No.: US 11,862,851 B2
(45) Date of Patent: Jan. 2, 2024

(54) ANTENNA DEVICE

(71) Applicant: TMY Technology Inc., Taipei (TW)

(72) Inventors: Chun-Cheng Chan, Taipei (TW); Jiun-Wei Wu, Taipei (TW); Chih-Hsien Wu, Taipei (TW); Su-Wei Chang, Taipei (TW)

(73) Assignee: TMY Technology Inc.

( * ) Notice: Subject to any disclaimer, the term of this patent is extended or adjusted under 35 U.S.C. 154(b) by 0 days.

(21) Appl. No.: 17/895,039

(22) Filed: Aug. 24, 2022

(65) Prior Publication Data

US 2023/0223701 A1 Jul. 13, 2023

Related U.S. Application Data

(60) Provisional application No. 63/298,188, filed on Jan. 10, 2022.

(30) Foreign Application Priority Data

Jun. 21, 2022 (TW) ................................ 111122946

(51) Int. Cl.
*H01Q 13/18* (2006.01)
*H01Q 13/06* (2006.01)

(52) U.S. Cl.
CPC ............ *H01Q 13/18* (2013.01); *H01Q 13/06* (2013.01)

(58) Field of Classification Search
CPC ...... H01Q 1/3233; H01Q 13/06; H01Q 13/18; H01Q 21/0006–0093
See application file for complete search history.

(56) References Cited

U.S. PATENT DOCUMENTS 3,778,838 A 12/1973 Clavin
9,543,660 B2 1/2017 Rajagopalan et al.
(Continued)

FOREIGN PATENT DOCUMENTS

CN 201378629 1/2010
CN 103414028 11/2013
(Continued)

OTHER PUBLICATIONS

Guan-Long Huang et al., "Waveguide-Fed Cavity Backed Slot Antenna Array with High Efficiency in the Ku-band", Antennas and Propagation Society International Symposium, 2012 IEEE, Jul. 8, 2012, pp. 1-2.
(Continued)

*Primary Examiner* — Robert Karacsony
(74) *Attorney, Agent, or Firm* — JCIPRNET

(57) ABSTRACT

An antenna device, including a case assembly, a first waveguide assembly, and a second waveguide assembly, is provided. A cavity is defined by an interior of the case assembly, and a first side of the case assembly has a slot penetrating the case assembly. At least part of the first waveguide assembly is located within the cavity and is connected to the first side. A projection of the first waveguide assembly to the first side is symmetrically located on two sides of the slot. The second waveguide assembly is located outside the case assembly, is close to the first side, and is connected to the slot. The second waveguide assembly is suitable for transmitting an antenna signal to the cavity through the slot and the first waveguide assembly. The antenna signal resonates in the cavity and radiates outward from a second side of the cavity opposite to the first side.

18 Claims, 15 Drawing Sheets

(56) References Cited

U.S. PATENT DOCUMENTS

| | | | | |
|---|---|---|---|---|
| 2012/0162015 | A1 | 6/2012 | Chen et al. | |
| 2020/0212594 | A1* | 7/2020 | Kirino | H01Q 21/064 |

FOREIGN PATENT DOCUMENTS

| | | |
|---|---|---|
| CN | 111342216 | 6/2020 |
| CN | 113300094 | 8/2021 |
| TW | I249264 | 2/2006 |

OTHER PUBLICATIONS

“Search Report of Europe Counterpart Application”, dated Jun. 5, 2023, p. 1-p. 9.

“Office Action of Taiwan Counterpart Application”, dated Jul. 28, 2023, p. 1-p. 4.

* cited by examiner

ANTENNA DEVICE

CROSS-REFERENCE TO RELATED APPLICATION

This application claims the priority benefit of U.S. Provisional Application No. 63/298,188, filed on Jan. 10, 2022 and Taiwan Application No. 111122946, filed on Jun. 21, 2022. The entirety of each of the above-mentioned patent applications is hereby incorporated by reference herein and made a part of this specification.

BACKGROUND

Technical Field

The disclosure relates to an antenna device, and in particular to an antenna device having a resonant cavity.

Description of Related Art

With the development of technology, the stability and effect of signals of an antenna device during transmission are gradually improved. Among different types of antenna devices, the antenna device with the resonant cavity is suitable for resonating an antenna signal in the resonant cavity, and then radiating the antenna signal from the resonant cavity to the outside. This type of antenna device has good signal transmission. Therefore, how to further improve the antenna device with the resonant cavity to have good signal transmission and a more stable and symmetrical field distribution is the research direction in the art.

SUMMARY

The disclosure provides an antenna device, which has good signal transmission and a stable and symmetrical field distribution.

The antenna device of the disclosure includes a case assembly, a first waveguide assembly, and a second waveguide assembly. A cavity is defined by an interior of the case assembly, and a first side of the case assembly has a slot penetrating the case assembly. At least part of the first waveguide assembly is located within the cavity and is connected to the first side of the case assembly. A projection of the first waveguide assembly to the first side of the case assembly is located symmetrically on two sides of the slot. The second waveguide assembly is located outside the case assembly, is close to the first side, and is connected to the slot. The second waveguide assembly is suitable for transmitting an antenna signal to the cavity through the slot and the first waveguide assembly. The antenna signal resonates in the cavity and radiates outward from a second side of the cavity opposite to the first side.

DETAILED DESCRIPTION OF DISCLOSED EMBODIMENTS

Figure 1:
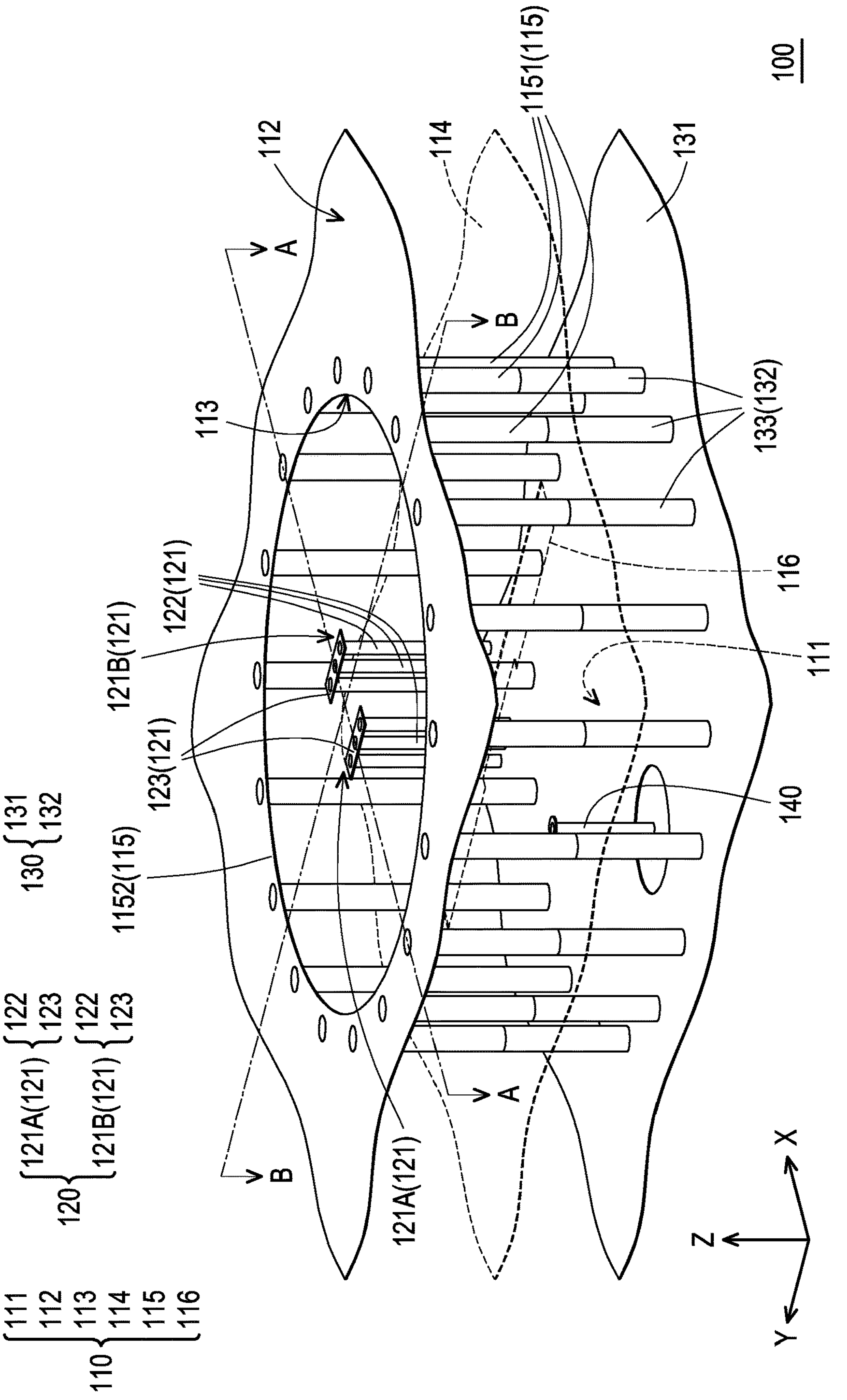
FIG. 1 is a perspective view of an antenna device according to an embodiment of the disclosure.
Figure 2A:
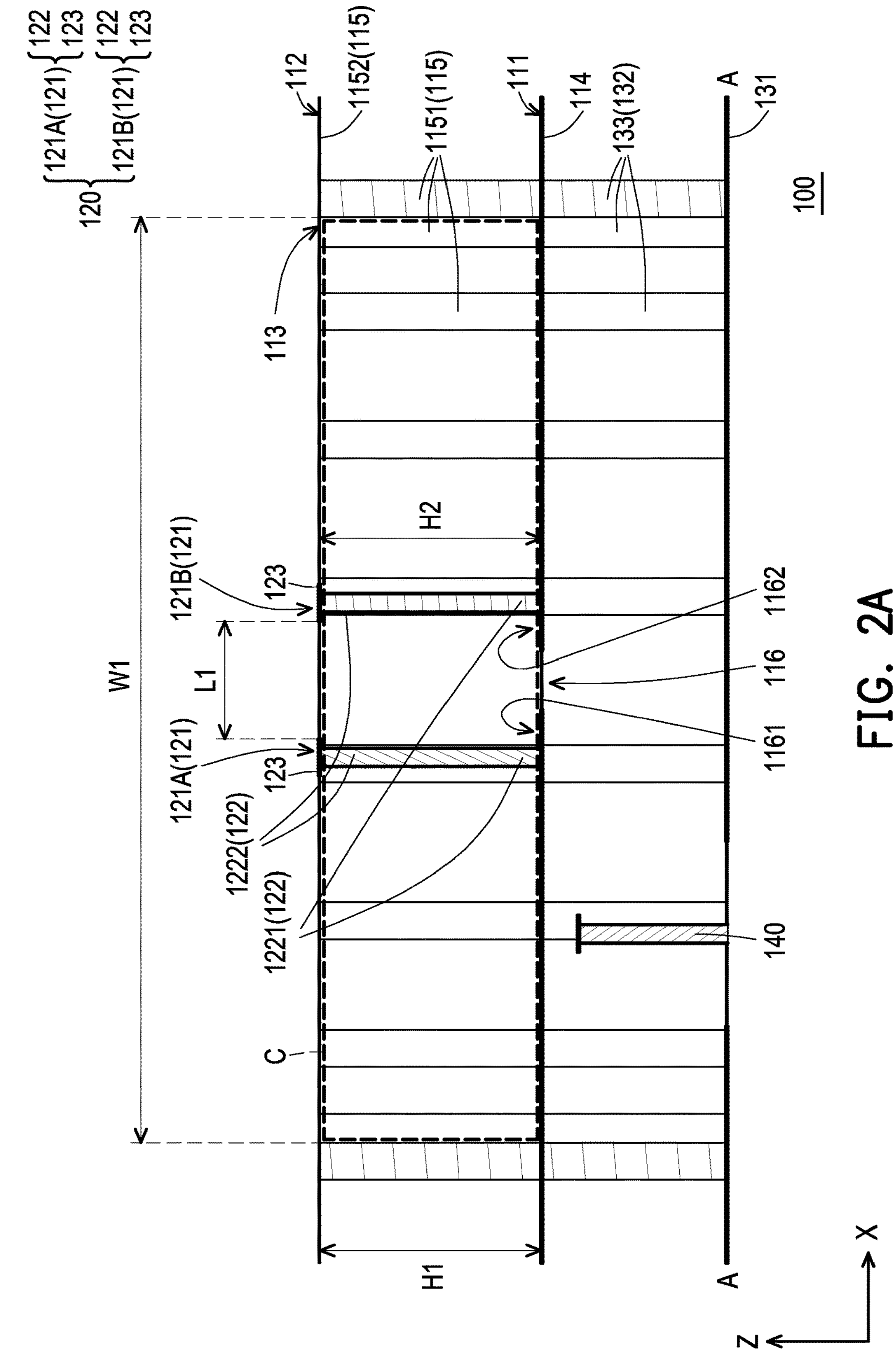
FIG. 2A is a cross-sectional view along a line segment A-A of FIG. 1.
Figure 2B:
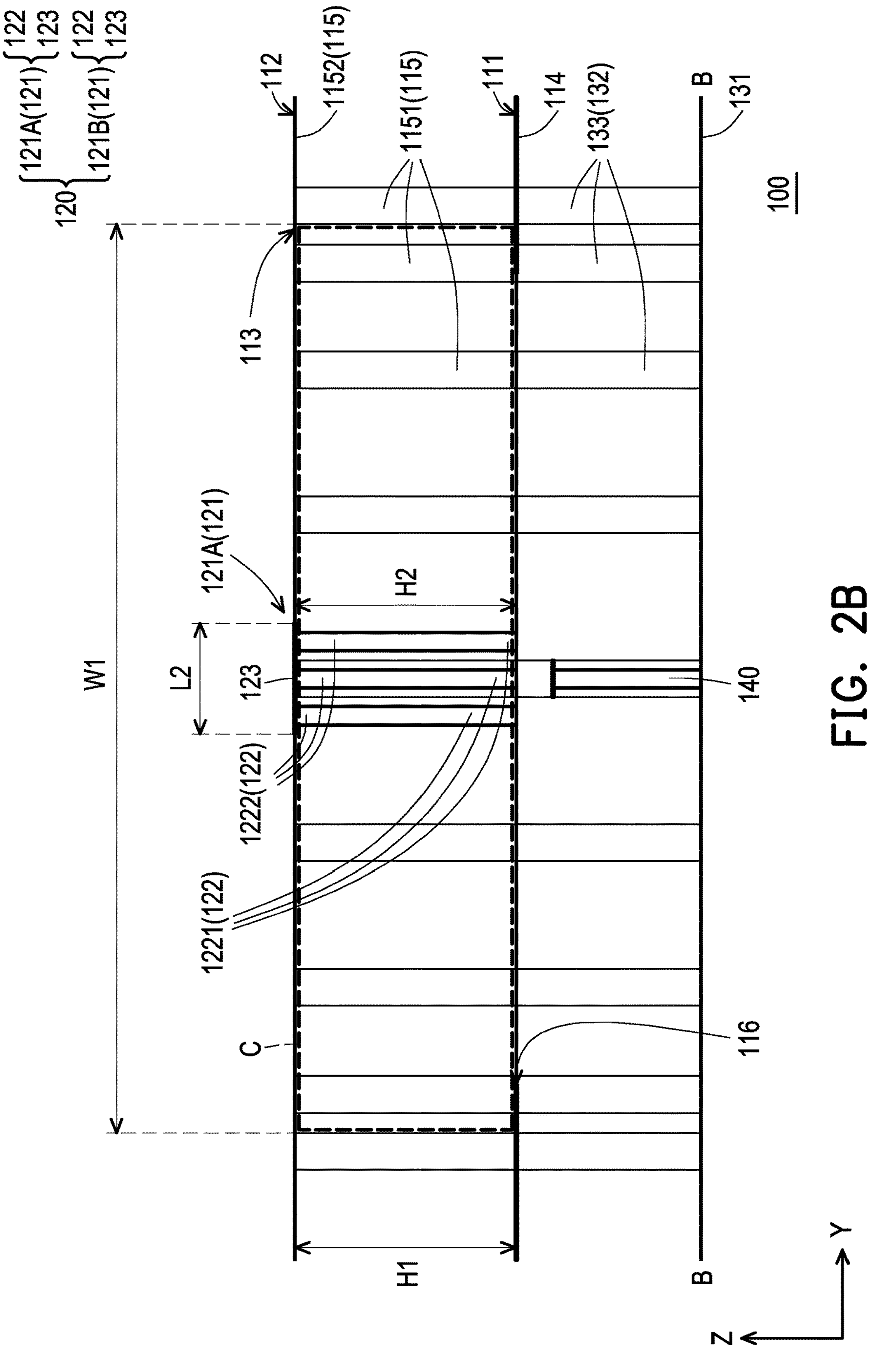
FIG. 2B is a cross-sectional view along a line segment B-B of FIG. 1.

FIG. 1 is a perspective view of an antenna device according to an embodiment of the disclosure, FIG. 2A is a cross-sectional view along a line segment A-A of FIG. 1, and FIG. 2B is a cross-sectional view along a line segment B-B of FIG. 1.

It should be noted that some components of FIG. 1 are drawn in a perspective manner for the purposes of clear representation and convenient description.

Please refer to FIG. 1 to FIG. 2B. An antenna device 100 of this embodiment includes a case assembly 110, a first waveguide assembly 120, and a second waveguide assembly 130. A cavity C (FIG. 2A and FIG. 2B) is defined by an interior of the case assembly 110, and a first side 111 of the case assembly 110 has a slot 116 penetrating the case assembly 110.

In this embodiment, the case assembly 110 of the antenna device 100 has an opening 113 on a second side 112, and the case assembly 110 includes a first conductor layer 114 located on the first side 111 and a first cavity wall structure 115 located between the first conductor layer 114 and the opening 113. The first cavity wall structure 115 is connected to a periphery of the opening 113 and the first conductor layer 114, and the cavity C is located between the first cavity wall structure 115, the first conductor layer 114, and the opening 113. In other words, the first cavity wall structure 115, the first conductor layer 114, and the opening 113 jointly form the range of the cavity C.

Further, the first cavity wall structure 115 of this embodiment includes multiple first conductor pillars 1151 and a third conductor layer 1152. The third conductor layer 1152 defines the opening 113. The first conductor pillars 1151 are connected to the third conductor layer 1152 and the first conductor layer 114 at equal spacings, and the heights of the first conductor pillars 1151 are equal. The arrangement manner of the first conductor pillars 1151 is suitable for defining the range of the cavity C.

In this embodiment, the antenna device 100 is suitable for being operated in a radiation frequency band, an opening width W1 (FIG. 2A and FIG. 2B) of the opening 113 is substantially equal to ½ times a wavelength belonging to the radiation frequency band, a height H1 (FIG. 2A and FIG. 2B) of the first cavity wall structure 115 is substantially equal to ¼ times the wavelength belonging to the radiation frequency band, and a height H2 (FIG. 2A and FIG. 2B) of the first waveguide assembly 120 is substantially equal to ¼ times the wavelength belonging to the radiation frequency band. In this embodiment, the opening width W1 is ½ times the wavelength, the height H1 is ¼ times the wavelength, and the height H2 is also ¼ times the wavelength, which is not limited by the disclosure. In each embodiment of the disclosure, being substantially equal refers to being within an error of ±5% (inclusive of two ends).

Figure 3:
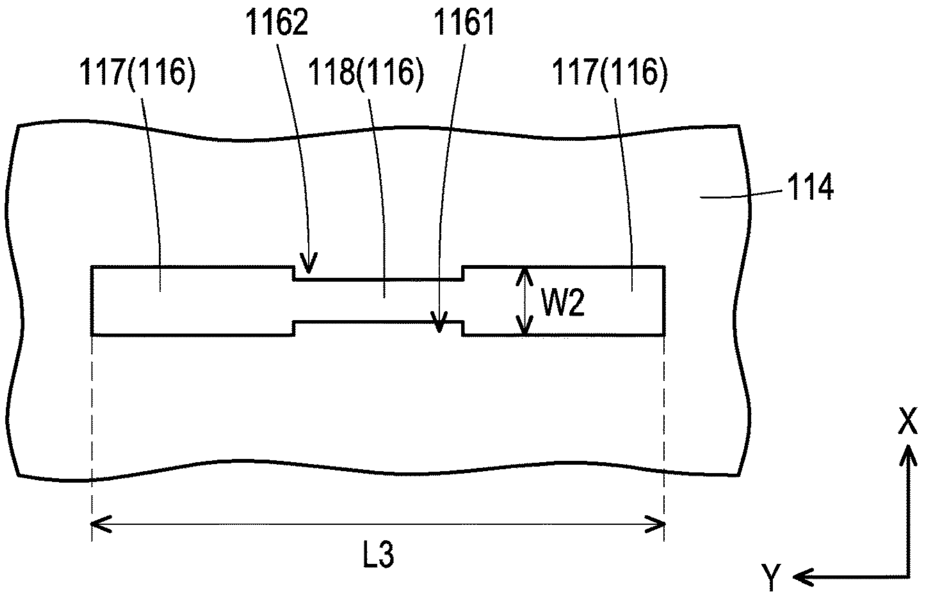
FIG. 3 is a schematic top view of a slot of the antenna device of FIG. 1.

FIG. 3 is a schematic top view of a slot of the antenna device of FIG. 1. Please refer to FIG. 1 and FIG. 3. The slot 116 of this embodiment extends along a direction Y, the slot 116 includes two end parts 117 in opposite and a middle segment 118 located between the two end parts 117, and the width of each end part 117 is greater than the width of the middle segment 118. Specifically, a length L3 (FIG. 3) of the slot 116 is substantially equal to ½ times the wavelength belonging to the radiation frequency band, and a maximum width W2 (FIG. 3) of the slot 116 is less than ¼ times the wavelength belonging to the radiation frequency band.

It is worth mentioning that the appearance of the slot 116 of this embodiment is symmetrical along both a direction X and the direction Y, and this design enables the antenna device 100 to have a symmetrical field distribution. In addition, if the length L3 of the slot 116 is longer or the maximum width W2 is narrower, the antenna device 100 can thus have a greater equivalent capacitance. The length L3 and the maximum width W2 of the slot 116 of the antenna device 100 may be adjusted during manufacturing according to the user requirements for impedance to change the capacitance of the antenna device 100, so as to achieve a customized design.

In addition, please refer to FIG. 1 to FIG. 2B. At least part of the first waveguide assembly 120 of this embodiment is located within the cavity C and is connected to the first side 111 of the case assembly 110. As shown in FIG. 2A, a projection of the first waveguide assembly 120 to the first side 111 of the case assembly 110 is symmetrically located on two sides of the slot 116. The first waveguide assembly 120 is disposed on the two sides of the slot 116 of the case assembly 110 as shown in FIG. 1.

In this embodiment, the first waveguide assembly 120 includes two conductor components 121, which are respectively a conductor component 121A and a conductor component 121B. As shown in FIG. 2A, the conductor component 121A and the conductor component 121B are respectively symmetrically connected to a first side edge 1161 of the slot 116 and a second side edge 1162 of the slot 116 opposite to the first side edge 1161, and the conductor component 121A and the conductor component 121B are parallel to each other and are perpendicular to a plane where the opening 113 (FIG. 1 and FIG. 2A) is located. Specifically, each of the conductor component 121A and the conductor component 121B includes multiple second conductor pillars 122 and a conductor plate 123. A first end 1221 of each second conductor pillar 122 is connected to the first side edge 1161 or the second side edge 1162 of the slot 116. The conductor plate 123 is connected to a second end 1222 of each second conductor pillar 122, and the position of the second end 1222 is located opposite to the first end 1221.

Thereby, each of the conductor component 121A and the conductor component 121B of this embodiment may be equivalent to a whole metal wall due to the arrangement manner of the second conductor pillar 122 and the conductor plate 123. The conductor component 121A and the conductor component 121B, which are equivalent to two metal walls, are respectively symmetrically disposed on the first side edge 1161 and the second side edge 1162 of the slot 116. An antenna signal may be transmitted and reflected between the conductor components 121 respectively located on the first side edge 1161 and the second side edge 1162, and then transmitted to the cavity C. Since the conductor component 121A and the conductor component 121B are symmetrically disposed on the two sides of the slot 116, the antenna signal can have a more stable and symmetrical field distribution.

It is worth mentioning that if a spacing L1 (FIG. 2A) between the two conductor components 121 of this embodiment is narrower or a length L2 (FIG. 2B) jointly formed by the second conductor pillar 122 and the conductor plate 123 is longer, the first waveguide assembly 120 can have a greater capacitance. If the thickness or the number of the second conductor pillar 122 is increased, the first waveguide assembly 120 can have a smaller inductance. The antenna device 100 may adjust the capacitance and the inductance of the first waveguide assembly 120 during manufacturing according to the user requirements for impedance, so as to achieve a customized design.

The height H2 of the first waveguide assembly 120 of this embodiment is equal to the height H1 of the first cavity wall structure 115 as shown in FIG. 2A, and the first waveguide assembly 120 is connected to the first side edge 1161 of the slot 116 and the second side edge 1162 opposite to the first side edge 1161. However, in other embodiments of the disclosure, the height H2 of the first waveguide assembly 120 may be higher or lower than the height H1 of the first cavity wall structure 115, and the position of the first end 1221 (FIG. 2A and FIG. 2B) of the first waveguide assembly 120 may exceed the first conductor layer 114 and extend toward the direction of a second conductor layer 131, which is not limited by the disclosure.

In addition, the second waveguide assembly 130 of this embodiment is located outside the case assembly 110, and the second waveguide assembly 130 is close to the first side 111 and is connected to the slot 116. The second waveguide assembly 130 is suitable for transmitting an antenna signal (not shown) to the cavity C through the slot 116 and the first waveguide assembly 120. The antenna signal then resonates in the cavity C and radiates outward from the second side 112 of the cavity C opposite to the first side 111.

The second waveguide assembly 130 of this embodiment includes the second conductor layer 131 and a second cavity wall structure 132. The second conductor layer 131 is located outside the case assembly 110 and is located next to the first side 111. The second conductor layer 131 has a fixed voltage. For example, the second conductor layer 131 is a ground layer with a fixed voltage of zero. The second cavity wall structure 132 is located between the second conductor layer 131 and the first side 111 of the case assembly 110, and connects the second conductor layer 131 and the first side 111 of the case assembly 110. The second cavity wall structure 132 includes multiple third conductor pillars 133 separated from each other.

It should be noted that in addition to the function of defining the range of the second waveguide assembly 130, the third conductor pillars 133 of this embodiment also have the effect of electrically connecting the first conductor layer 114 to the second conductor layer 131, so that the first conductor layer 114 and the second conductor layer 131 both have a fixed voltage. In addition, since the first conductor pillar 1151 is electrically connected to the first conductor layer 114, the first conductor pillar 1151 and the third conductor layer 1152 also have the same fixed voltage as the first conductor layer 114 and the second conductor layer 131.

In this embodiment, the positions of the first conductor pillars 1151 and the positions of the third conductor pillars 133 correspond to each other as shown in FIG. 1. However, in other embodiments of the disclosure, the positions of the first conductor pillars 1151 and the positions of the third conductor pillars 133 may also be staggered, which is not limited by the disclosure.

Figure 4:
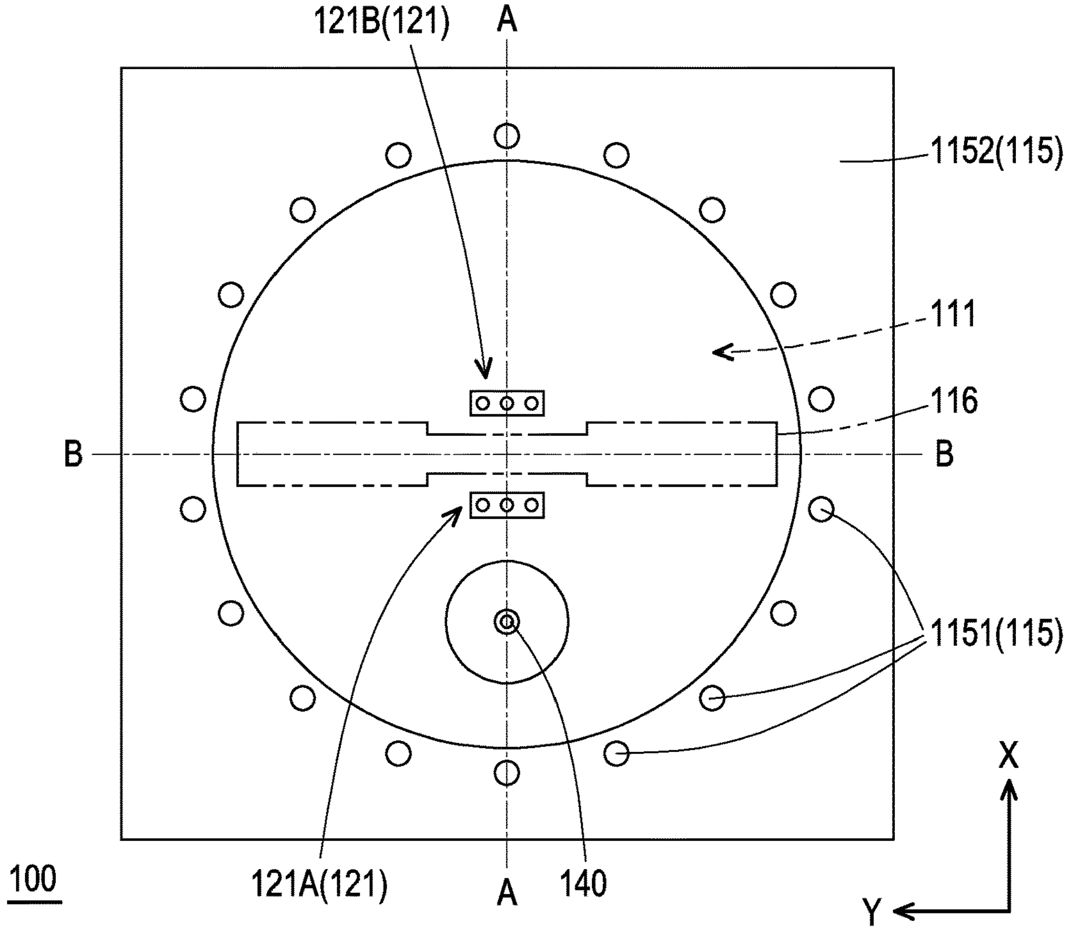
FIG. 4 is a top view of the antenna device of FIG. 1.

FIG. 4 is a top view of the antenna device of FIG. 1. It should be noted that some components of FIG. 4 are drawn in a perspective manner for the purposes of clear representation and convenient description.

Please refer to FIG. 1 and FIG. 4. The antenna device 100 of this embodiment further includes a feeding portion 140, which is isolated from the second conductor layer 131 and is at least partially located within the second cavity wall structure 132 as shown in FIG. 1. Further, the feeding portion 140 is located outside the case assembly 110 and is close to the first side 111, and a projection of the feeding portion 140 to the first side 111 is staggered from the slot 116 as shown in FIG. 4. The slot 116 extends along the direction Y, and a line connecting the projection of the feeding portion 140 on the first side 111 and the center of the slot 116 is perpendicular to the direction Y. In other words, the line connecting the projection of the feeding portion 140 on the first side 111 and the center of the slot 116 is parallel to the direction X.

One end of the feeding portion 140 of this embodiment close to the second conductor layer 131 is flush with the second conductor layer 131 as shown in FIG. 2. However, in other embodiments of the disclosure, one end of the feeding portion 140 close to the second conductor layer 131 may extend beyond the range of the second waveguide assembly 130 toward a direction away from the first conductor layer 114, which is not limited by the disclosure.

In the antenna device 100 of this embodiment under the abovementioned configuration manner, the antenna signal has good signal transmission during the process of being sequentially transmitted in the second waveguide assembly 130, the slot 116, the first waveguide assembly 120, and the cavity C. In addition, since the first waveguide assembly 120 is symmetrically disposed on the two sides of the slot 116, the antenna signal can have a more stable and symmetrical field distribution. The antenna device 100 can have good signal transmission and a stable and symmetrical field distribution.

Figure 5:
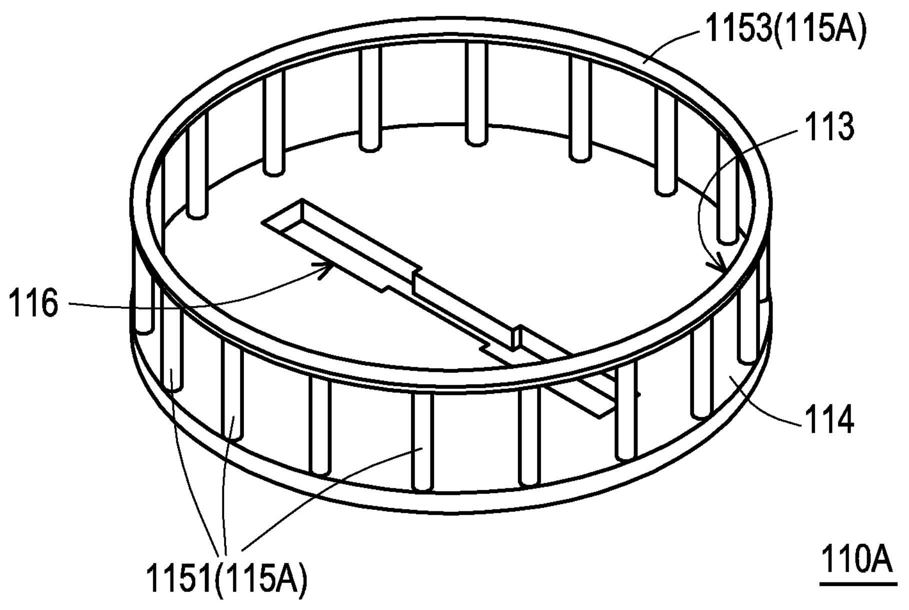
FIG. 5 is a perspective view of a case assembly of an antenna device according to another embodiment of the disclosure.

It should be noted that the form of the case assembly of the antenna device is not limited to FIG. 1, and other forms of the case assembly are introduced below. FIG. 5 is a perspective view of a case assembly of an antenna device according to another embodiment of the disclosure.

Please refer to FIG. 1 and FIG. 5. Compared with the first cavity wall structure 115 shown in FIG. 1, a first cavity wall structure 115A shown in FIG. 5 replaces the third conductor layer 1152 (FIG. 1) of the first cavity wall structure 115 (FIG. 1) with a conductor ring 1153. The first cavity wall structure 115A includes multiple first conductor pillars 1151 and the conductor ring 1153. The conductor ring 1153 defines an opening 113 of a case assembly 110A, and the conductor ring 1153 and the opening 113 are circular in shape. The first conductor pillars 1151 are connected to the conductor ring 1153 and the first conductor layer 114 at equal spacings, and the heights of the first conductor pillars 1151 are equal.

Figure 6A:
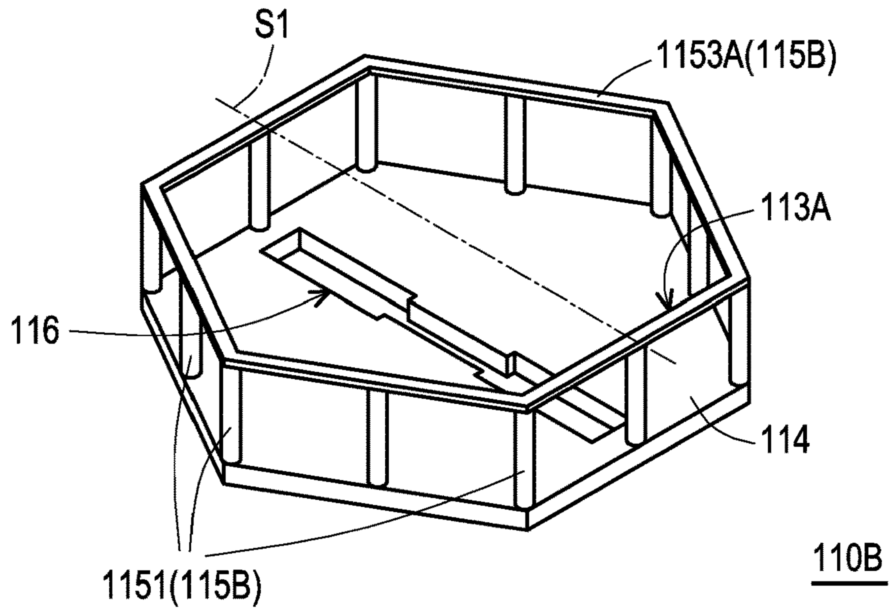
FIG. 6A is a perspective view of a case assembly of an antenna device according to another embodiment of the disclosure.
Figure 6B:
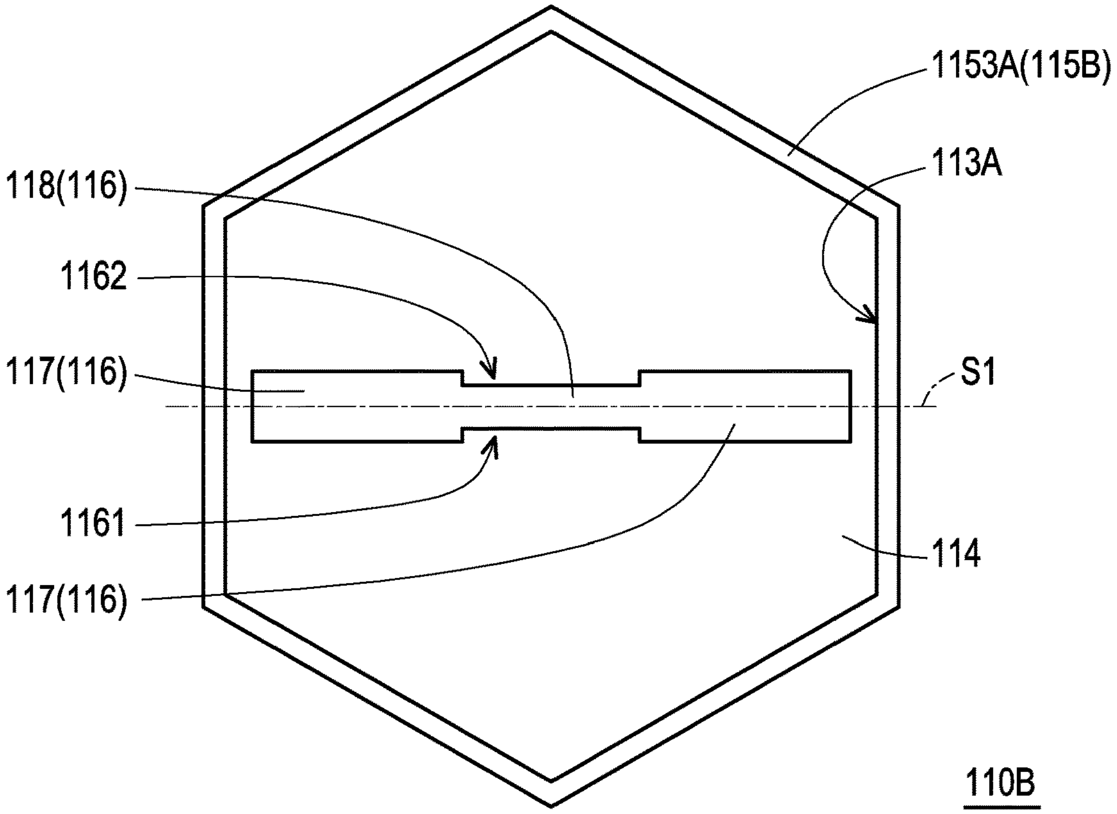
FIG. 6B is a top view of the case assembly of FIG. 6A.

FIG. 6A is a perspective view of a case assembly of an antenna device according to another embodiment of the disclosure, and FIG. 6B is a top view of the case assembly of FIG. 6A.

Please refer to FIG. 5 to FIG. 6B. Compared with the case assembly 110A shown in FIG. 5, the shapes of a conductor ring 1153A and an opening 113A of a case assembly 110B shown in FIG. 6A and FIG. 6B are symmetrical polygons, and the number of sides of the symmetrical polygon must be an even number. The disclosure does not limit the number of even-numbered sides. It is worth noting that an extending direction of a long side of a slot 116 (FIG. 6B) needs to be parallel to the direction of a line segment S1. The line segment S1 may cut the shape of the opening 113A into two symmetrical halves as shown in FIG. 6B. The extending direction of the long side of the slot 116 (FIG. 6B) is designed to be parallel to the direction of the line segment S1, which enables the antenna device to have a symmetrical field pattern.

Figure 7A:
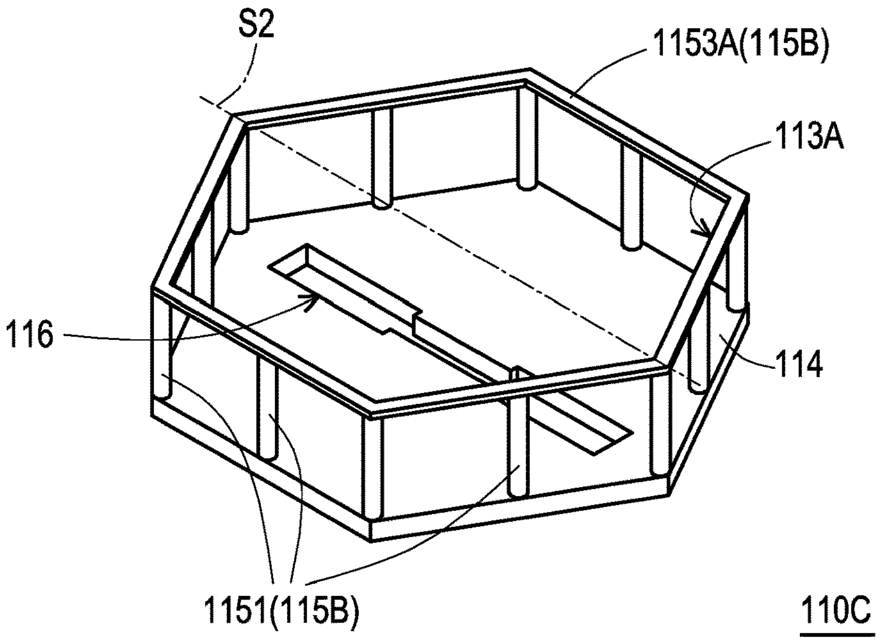
FIG. 7A is a perspective view of a case assembly of an antenna device according to another embodiment of the disclosure.
Figure 7B:
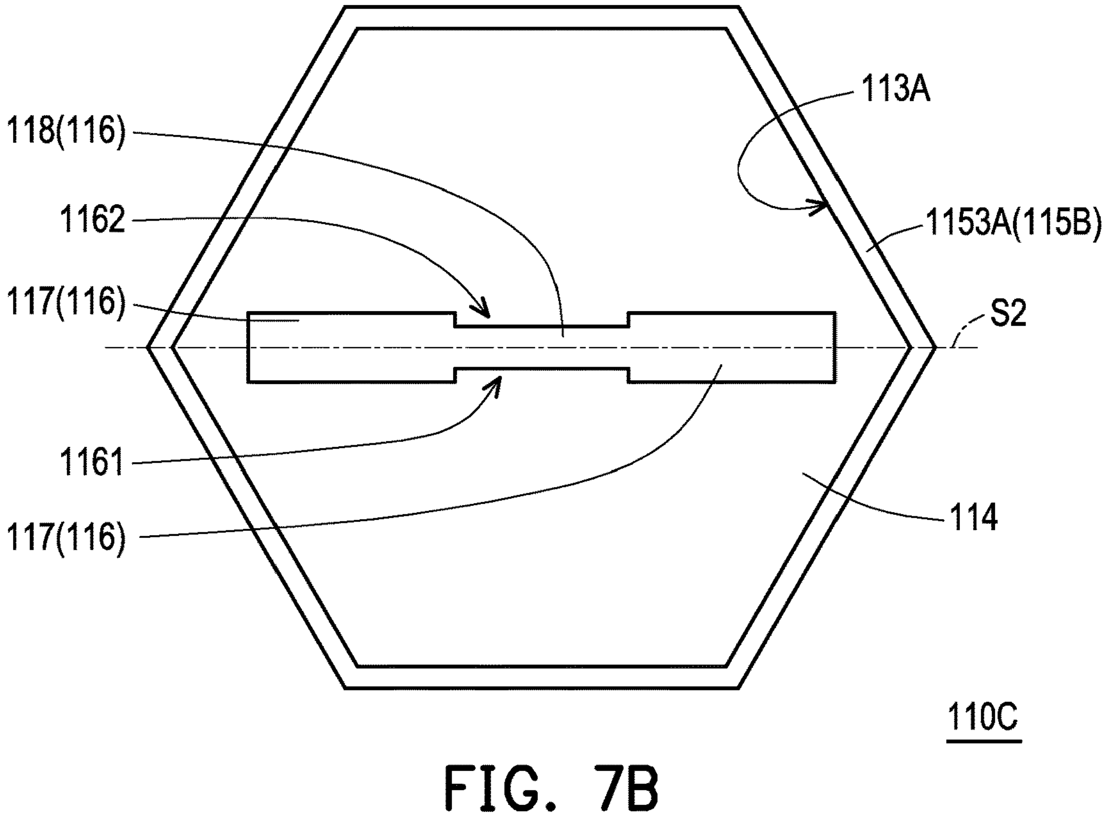
FIG. 7B is a top view of the case assembly of FIG. 7A.

FIG. 7A is a perspective view of a case assembly of an antenna device according to another embodiment of the disclosure, and FIG. 7B is a top view of the case assembly of FIG. 7A.

Please refer to FIG. 6A to FIG. 7B. A case assembly 110C shown in FIG. 7A and FIG. 7B is compared with the case assembly 110B shown in FIG. 6A, and the difference between the two is that an extending direction of a long side of a slot 116 (FIG. 7B) is parallel to the direction of a line segment S2. The line segment S2 may also cut the shape of an opening 113A into two symmetrical halves as shown in FIG. 7B. It is worth mentioning that since the shape of the opening 113A is a symmetrical polygon with an even number of sides, the opening 113A has a line segment S1 formed by connecting midpoints of two corresponding sides and the line segment S2 formed by connecting junctions of corresponding sides. The extending direction of the long side of the slot 116 (FIG. 6B and FIG. 7B) may be parallel to the direction of the line segment S1 or the direction of the line segment S2, which both enable the antenna device to have a symmetrical field pattern.

Figure 8:
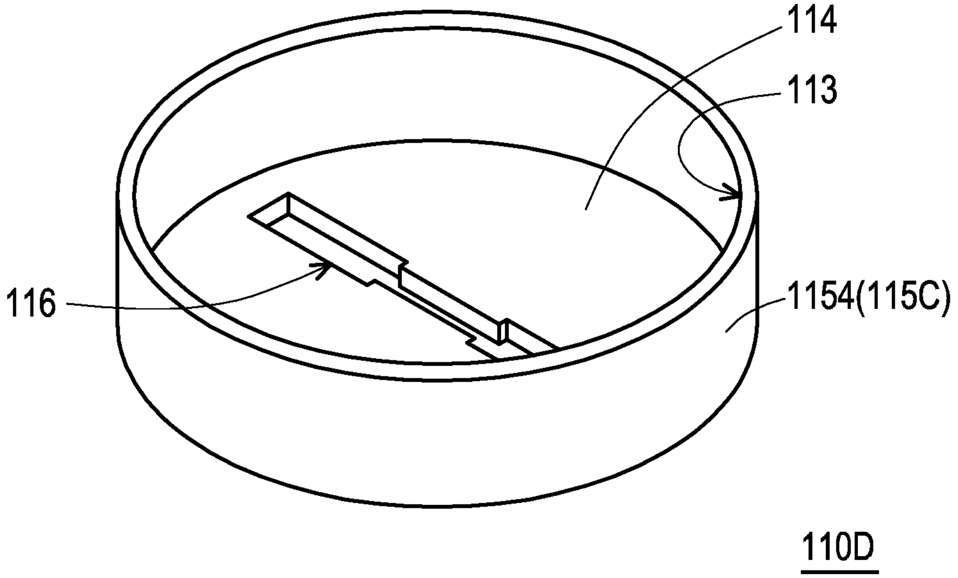
FIG. 8 is a perspective view of a case assembly of an antenna device according to another embodiment of the disclosure.
Figure 9A:
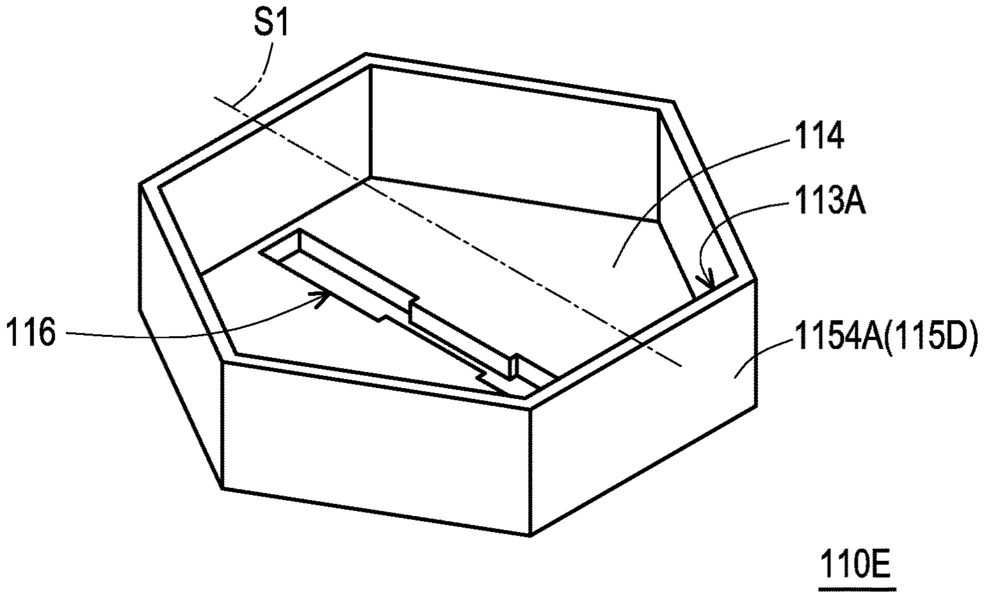
FIG. 9A is a perspective view of a case assembly of an antenna device according to another embodiment of the disclosure.
Figure 9B:
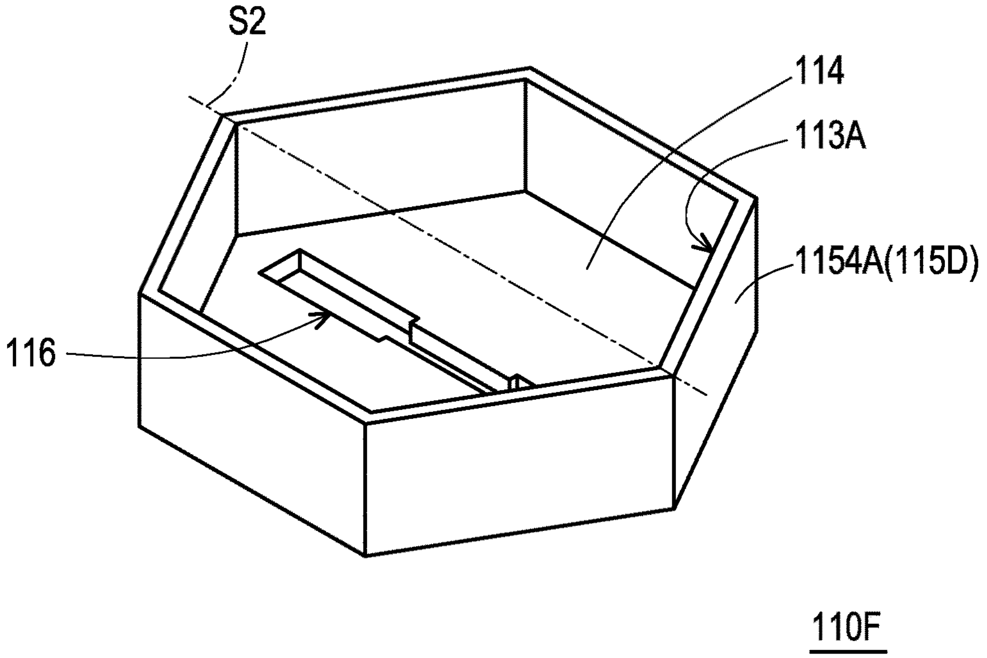
FIG. 9B is a perspective view of a case assembly of an antenna device according to another embodiment of the disclosure.

FIG. 8 is a perspective view of a case assembly of an antenna device according to another embodiment of the disclosure, and FIG. 9A and FIG. 9B are perspective views of a case assembly of an antenna device according to another embodiment of the disclosure.

Please refer to FIG. 8. A first cavity wall structure 115C shown in FIG. 8 includes at least one annular conductor wall 1154, and the at least one annular conductor wall 1154 has a single height. Further, since the shape of the annular conductor wall 1154 of the first cavity wall structure 115C is circular, the number of the conductor wall 1154 is one.

Please refer to FIG. 8 and FIG. 9A. A case assembly 110E shown in FIG. 9A is compared with a case assembly 110D shown in FIG. 8, and the difference between the two is that a first cavity wall structure 115D (FIG. 9A) includes at least one conductor wall 1154A in a symmetrical polygonal shape. The number of the conductor wall 1154A is plural, and the number of sides of the symmetrical polygon must be an even number. The disclosure does not limit the number of even-numbered sides. It is worth noting that an extending direction of a long side of a slot 116 (FIG. 9A) needs to be parallel to a line segment S1 (FIG. 9A). The line segment S1 may cut the shape of an opening 113A into two symmetrical halves. The extending direction of the long side of the slot 116 (FIG. 9A) is designed to be parallel to the direction of the line segment S1, which enables the antenna device to have a symmetrical field pattern.

Please refer to FIG. 9A and FIG. 9B. A case assembly 110F shown in FIG. 9B is compared with a case assembly 110E shown in FIG. 9A, and the difference between the two is that an extending direction of a long side of a slot 116 (FIG. 9B) is parallel to a line segment S2 (FIG. 9B). A line segment S1 and the line segment S2 may both cut an opening 113A into two symmetrical halves. The extending direction of the long side of the slot 116 (FIG. 9A and FIG. 9B) may be parallel to the direction of the line segment S1 (FIG. 9A) or the direction of the line segment S2 (FIG. 9B), which enables the antenna device to have a symmetrical field pattern.

Figure 10A:
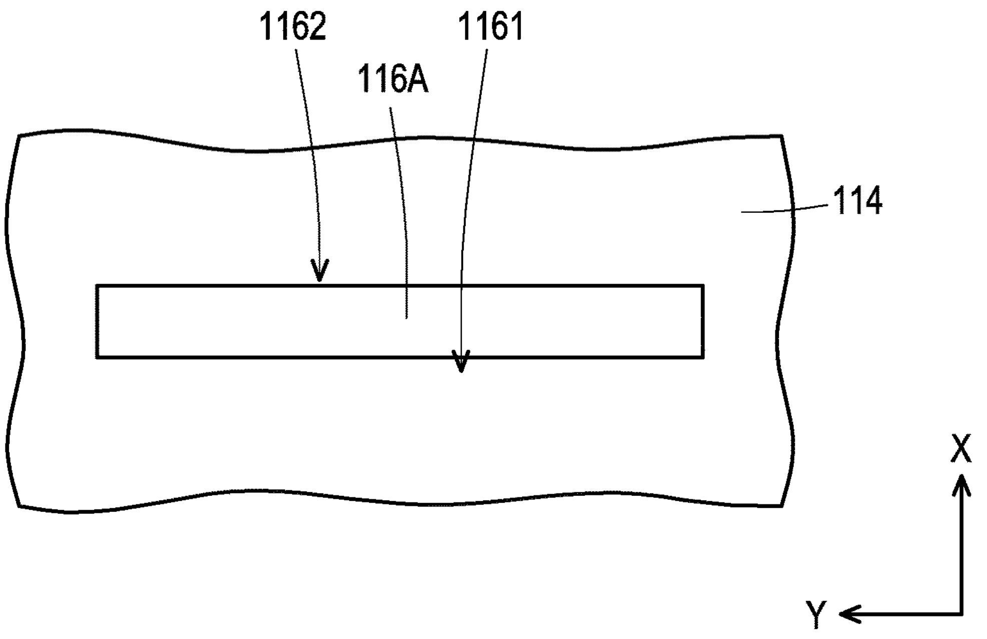
FIG. 10A to FIG. 10C are schematic top views of slots according to another embodiment of the disclosure.
Figure 10B:
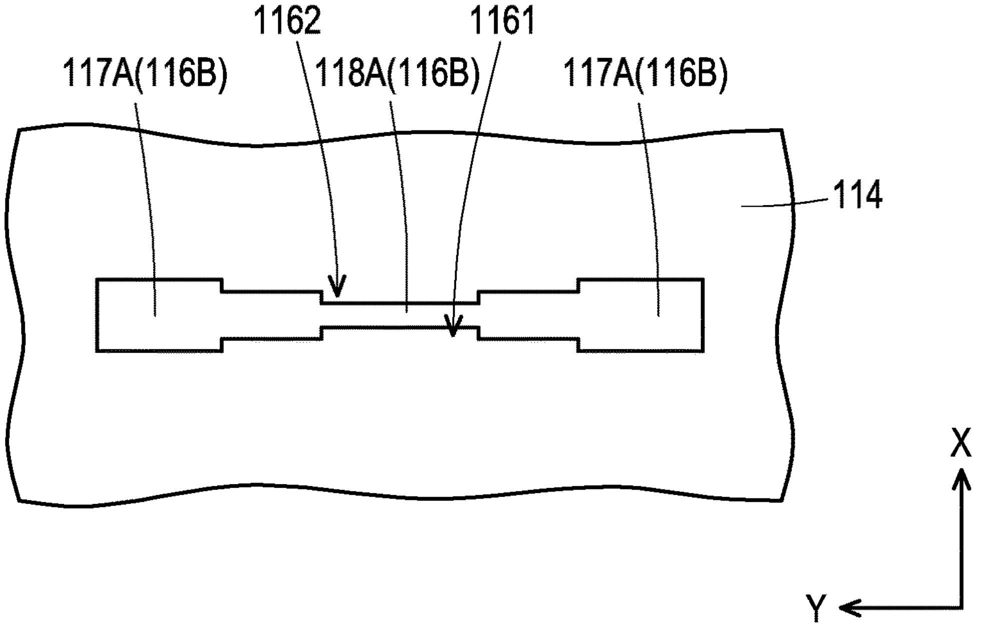
Figure 10C:
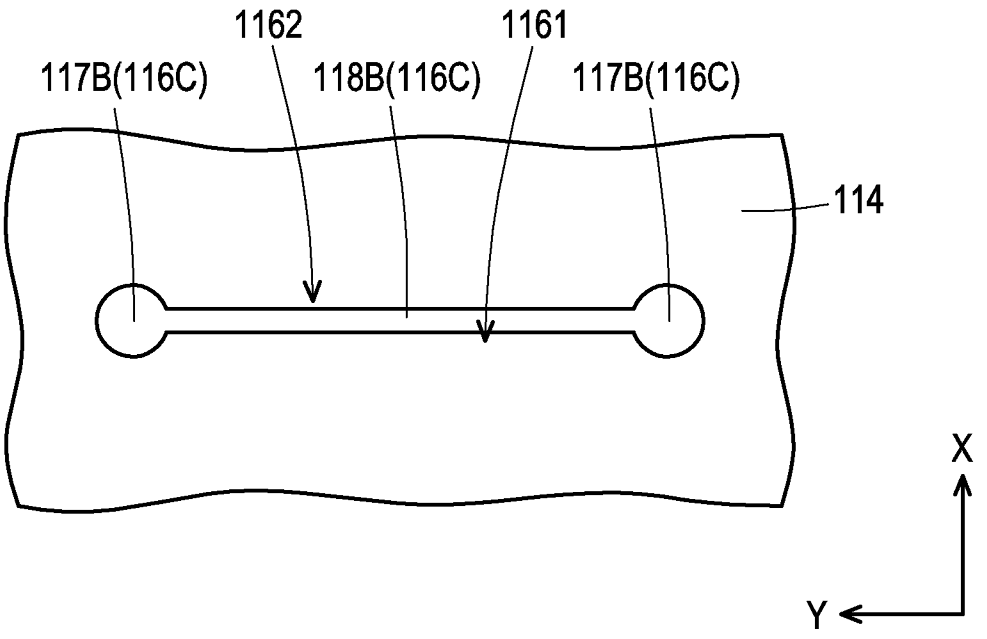
Figure 11A:
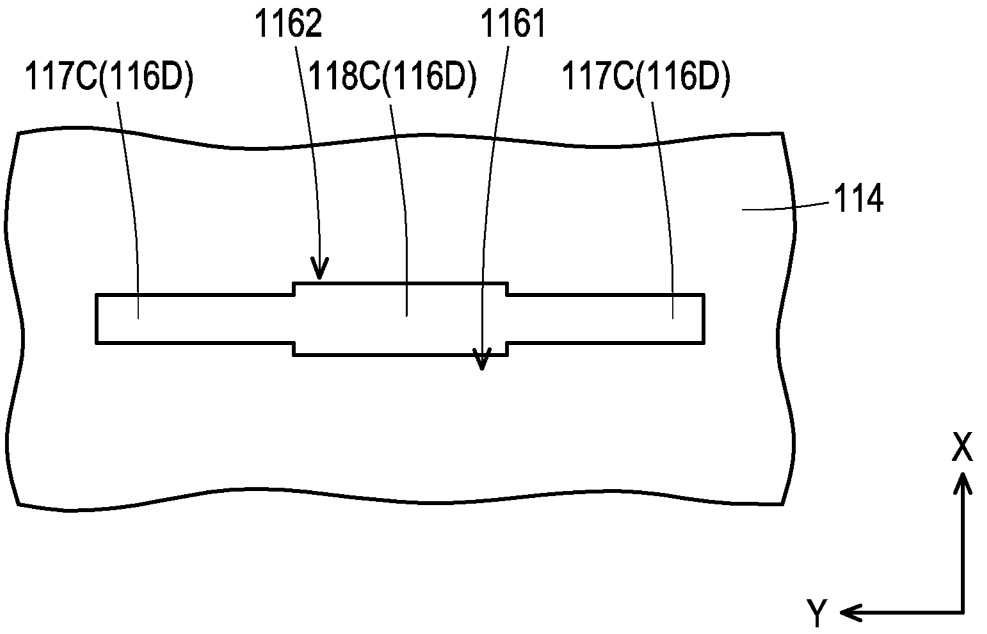
FIG. 11A to FIG. 11B are schematic top views of slots according to another embodiment of the disclosure.
Figure 11B:
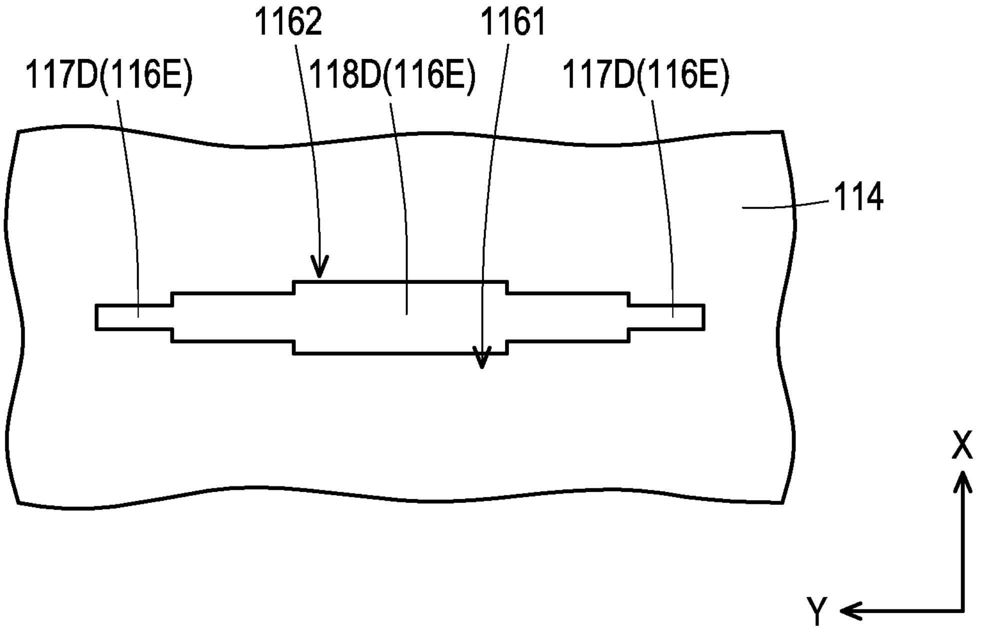

Furthermore, the slot may also have different forms. FIG. 10A to FIG. 10C are schematic top views of slots according to another embodiment of the disclosure, and FIG. 11A to FIG. 11B are schematic top views of slots according to another embodiment of the disclosure.

Please refer to FIG. 3 and FIG. 10A. A slot 116A shown in FIG. 10A is compared with the slot 116 shown in FIG. 3, and the difference between the two is that the slot 116A extends along a direction Y as shown in FIG. 10A, and the slot has equal width along the direction Y.

Please refer to FIG. 10A and FIG. 10B. A slot 116B shown in FIG. 10B is compared with the slot 116A shown in FIG. 10A, and the difference between the two is that the shape of an end part 117A of the slot 116B is stepped as shown in FIG. 10B.

In addition, please refer to FIG. 10B and FIG. 10C. A slot 116C shown in FIG. 10C is compared with the slot 116B shown in FIG. 10B, and the difference between the two is that the shape of an end part 117B of the slot 116C is circular as shown in FIG. 10C. It is worth mentioning that the shape of the slot may also be a trapezoid (not shown) tapered with an inclined line segment from the end part toward a middle segment direction, which is not limited by the disclosure.

Please refer to FIG. 10A and FIG. 11A. A slot 116D shown in FIG. 11A is compared with the slot 116A shown in FIG. 10A, and the difference between the two is that the width of each end part 117C of the slot 116D is less than the width of a middle segment 118C as shown in FIG. 11A.

Please refer to FIG. 11A and FIG. 11B. A slot 116E shown in FIG. 11B is compared with the slot 116D shown in FIG. 11A, and the difference between the two is that the shape of an end part 117D of the slot 116E may be stepped as shown in FIG. 11B. In addition, the shape of the slot may also be a trapezoid (not shown) that gradually expands with an inclined line segment from the end part toward a middle segment direction, which is not limited by the disclosure.

It is worth mentioning that the shapes of the slots shown in FIG. 10A to FIG. 11B are symmetrical whether along the long side direction or the width direction of the slots, which enables the antenna device to have a stable and symmetrical field pattern.

Figure 12:
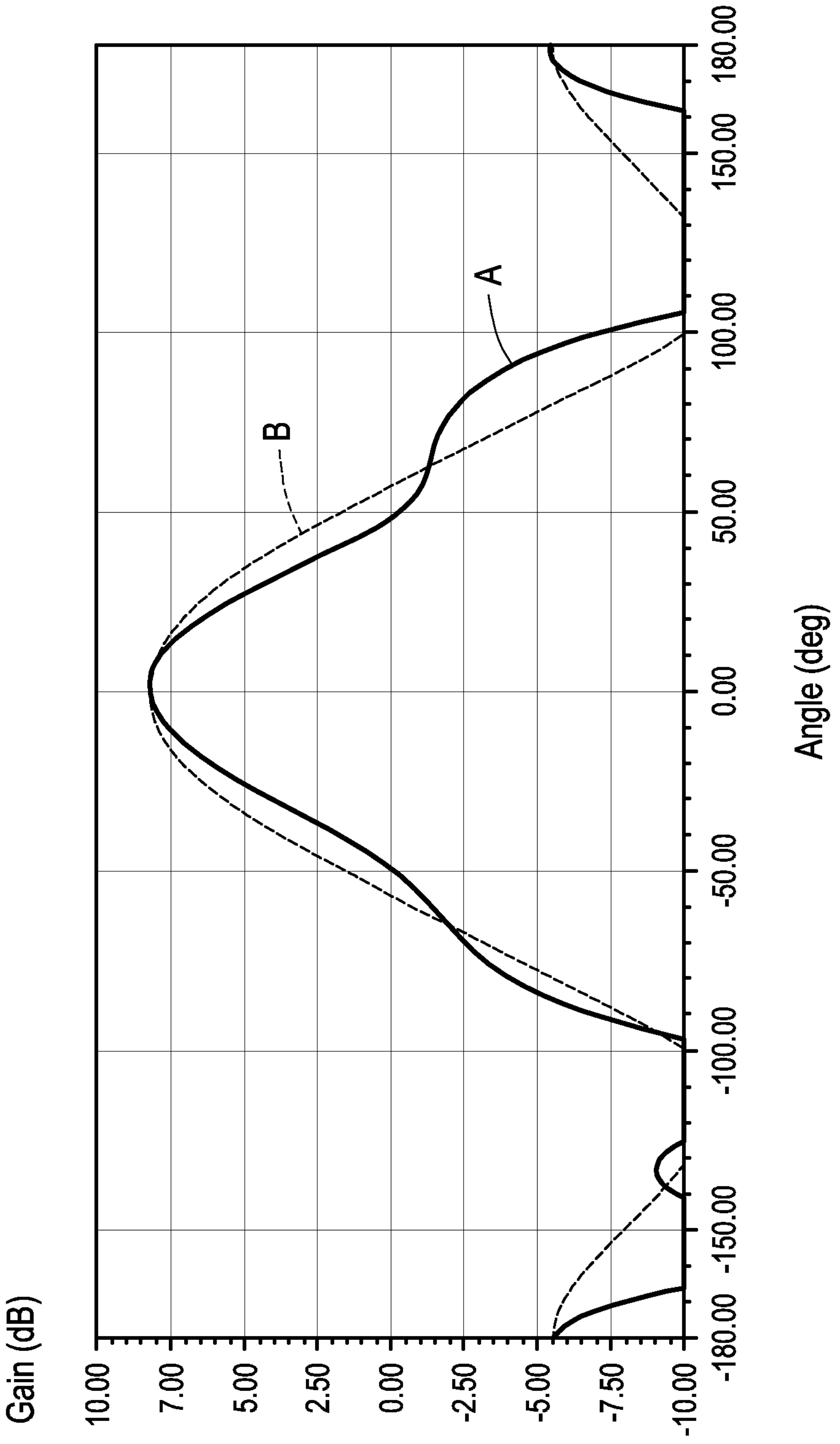
FIG. 12 is a relationship graph of gain against rotation angle of the antenna device of FIG. 1.

FIG. 12 is a relationship graph of gain against angle of the antenna device of FIG. 1. Please refer to FIG. 1 and FIG. 12. The antenna device 100 (FIG. 1) of this embodiment is rotated by specific angles with axes of a section line AA and a section line BB respectively projected on the first conductor layer 114 as rotation axes, so as to obtain the gain effects shown by a curve A (FIG. 12) and a curve B (FIG. 12), which show good performance in both gain effect and symmetry.

Figure 13:
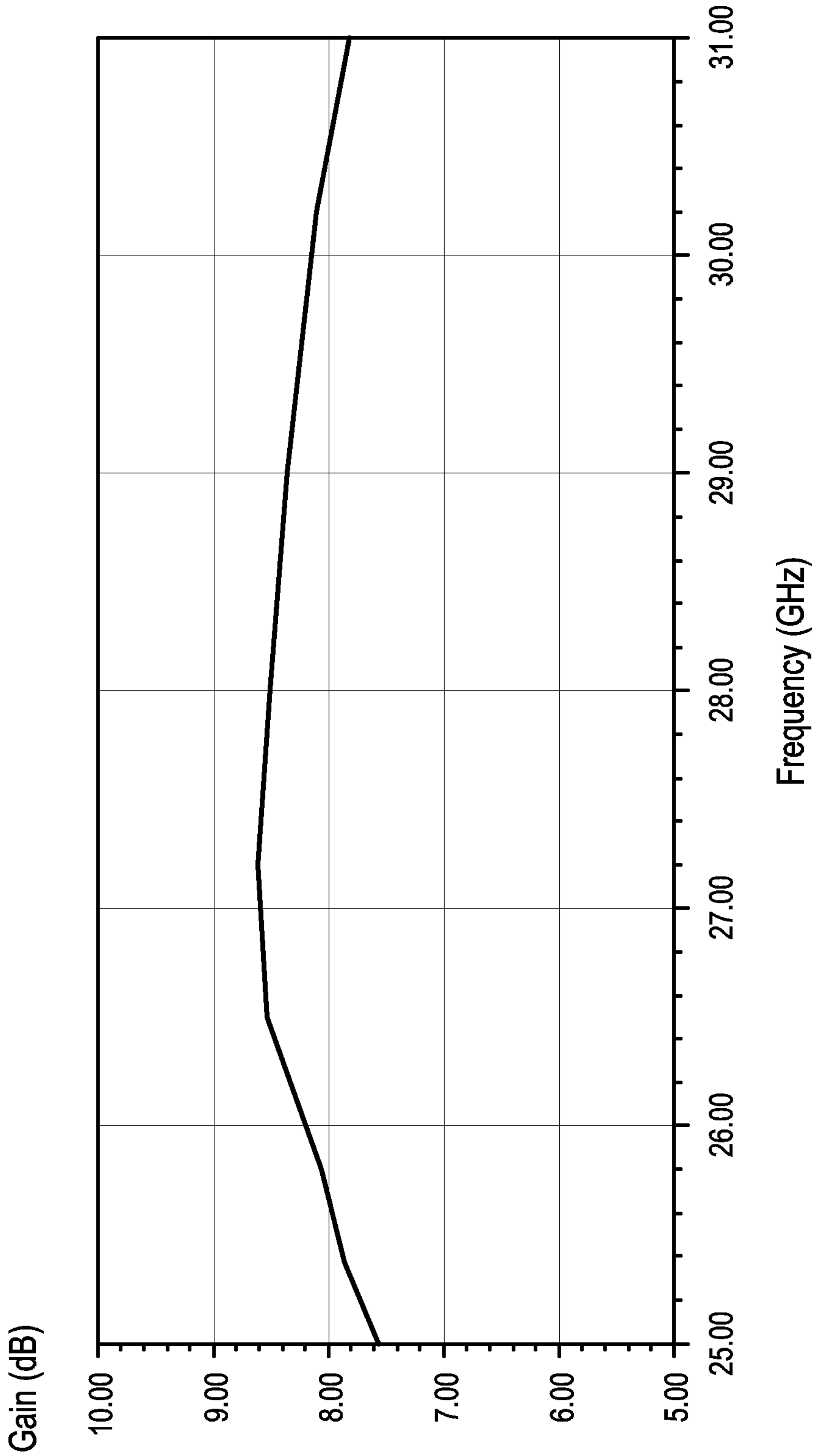
FIG. 13 is a relationship graph of gain against frequency of the antenna device of FIG. 1.
Figure 14:
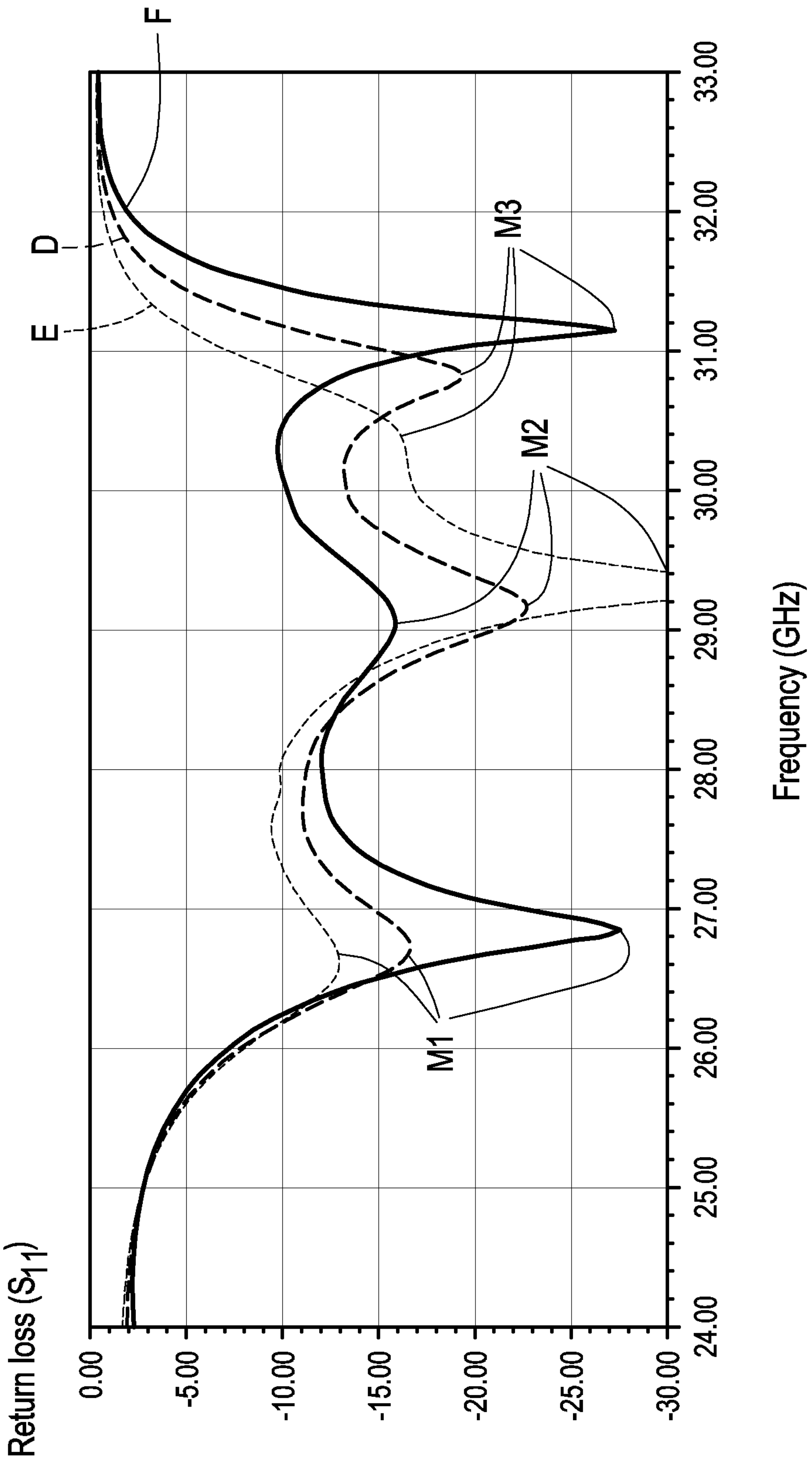
FIG. 14 is a relationship graph of return loss against frequency of the antenna device of FIG. 1.

FIG. 13 is a relationship graph of gain against frequency of the antenna device of FIG. 1, and FIG. 14 is a relationship graph of return loss ($S_{11}$) against frequency of the antenna device of FIG. 1. A curve D in FIG. 14 shows the return loss ($S_{11}$) of the antenna device 100 at each frequency when the length L3 (FIG. 3) of the slot 116 of this embodiment is substantially equal to 0.5 times the wavelength belonging to the radiation frequency band. A curve E shows the return loss ($S_{11}$) of the antenna device 100 at each frequency when the length L3 (FIG. 3) of the slot 116 is substantially equal to 0.52 times the wavelength belonging to the radiation frequency band, that is, the length L3 is substantially equal to an error of 5%. A curve F shows the return loss ($S_{11}$) of the antenna device 100 at each frequency when the length L3 (FIG. 3) of the slot 116 is substantially equal to 0.48 times the wavelength belonging to the radiation frequency band, that is, when the length L3 is substantially equal to an error of −5%.

Please refer to FIG. 13 and FIG. 14. The gain effects of the antenna device 100 of this embodiment at each frequency band are all greater than 5, and the return losses ($S_{11}$) of the antenna device 100 at frequencies respectively corresponding to a first resonant mode M1, a second resonant mode M2, and a third resonant mode M3 are all less than −10 dB, which show good performance. In detail, the cavity C, the slot 116, and the first waveguide assembly 120 of the antenna device 100 respectively contribute to the performances of the first resonant mode M1, the second resonant mode M2, and the third resonant mode M3 in terms of the return losses.

In summary, in the antenna device of the disclosure, the antenna signal has good signal transmission during the process of being sequentially transmitted in the second waveguide assembly, the slot, the first waveguide assembly, and the cavity. In addition, since the first waveguide assembly is symmetrically disposed on the two sides of the slot, the antenna signal can have a more stable and symmetrical field distribution. Furthermore, the antenna device of an embodiment may adjust the capacitance and the inductance of the first waveguide assembly during manufacturing or change the length and the maximum width of the slot to adjust the capacitance of the antenna device according to the user requirements for impedance, so as to achieve a customized design. In addition, the first cavity wall structure and the slot of an embodiment are both symmetrically designed, which enables the antenna device to have a stable and symmetrical field pattern.

What is claimed is:

1. An antenna device, comprising:

a case assembly, wherein a cavity is defined by an interior of the case assembly, and a first side of the case assembly has a slot penetrating the case assembly;

a first waveguide assembly, at least partially located within the cavity and connected to the first side of the case assembly, wherein a projection of the first waveguide assembly to the first side of the case assembly is symmetrically located on two sides of the slot; and a second waveguide assembly, located outside the case assembly, close to the first side, and connected to the slot, wherein the second waveguide assembly is suitable for transmitting an antenna signal to the cavity through the slot and the first waveguide assembly, wherein the antenna signal resonates in the cavity and radiates outward from a second side of the cavity opposite to the first side, wherein the case assembly has an opening on the second side, the case assembly comprises a first conductor layer located on the first side and a first cavity wall structure located between the first conductor layer and the opening, the first cavity wall structure is connected to a periphery of the opening and the first conductor layer, and the cavity is located between the first cavity wall structure, the first conductor layer, and the opening.

2. The antenna device according to claim 1, wherein a shape of the opening is a circle or a symmetrical polygon, and a number of sides of the symmetrical polygon is an even number.

3. The antenna device according to claim 1, wherein the antenna device is suitable for being operated in a radiation frequency band, and an opening width of the opening is substantially equal to ½ times a wavelength belonging to the radiation frequency band.

4. The antenna device according to claim 1, wherein the antenna device is suitable for being operated in a radiation frequency band, and a height of the first cavity wall structure is substantially equal to ¼ times a wavelength belonging to the radiation frequency band.

5. The antenna device according to claim 1, wherein the first cavity wall structure comprises a plurality of first conductor pillars and a conductor ring, the conductor ring defines the opening, and the first conductor pillars are connected to the conductor ring and the first conductor layer at equal spacings, wherein heights of the first conductor pillars are equal.

6. The antenna device according to claim 1, wherein the first cavity wall structure comprises at least one annular conductor wall, and the at least one annular conductor wall has a single height.

7. The antenna device according to claim 1, wherein the antenna device is suitable for being operated in a radiation frequency band, and a length of the slot is substantially equal to ½ times a wavelength belonging to the radiation frequency band.

8. The antenna device according to claim 1, wherein the antenna device is suitable for being operated in a radiation frequency band, and a maximum width of the slot is less than ¼ times a wavelength belonging to the radiation frequency band.

9. The antenna device according to claim 1, wherein the slot extends along a direction, and the slot has equal width in the direction.

10. The antenna device according to claim 1, wherein the slot comprises two end parts in opposite and a middle segment located between the two end parts, and a width of each of the end parts is greater than a width of the middle segment.

11. The antenna device according to claim 1, wherein the slot comprises two opposite end parts and a middle segment located between the two end parts, and a width of each of the end parts is less than a width of the middle segment.

12. The antenna device according to claim 1, wherein the case assembly has an opening on the second side, and the first waveguide assembly comprises:

two conductor components, respectively connected to a first side edge of the slot and a second side edge of the slot opposite to the first side edge, wherein the two conductor components are parallel to each other and are perpendicular to the opening.

13. The antenna device according to claim 12, wherein each of the conductor components comprises:

a plurality of second conductor pillars, wherein a first end of each of the second conductor pillars is connected to the first side edge or the second side edge of the slot; and a conductor plate, connected to a second end of each of the second conductor pillars opposite to the first end.

14. The antenna device according to claim 1, wherein the antenna device is suitable for being operated in a radiation frequency band, and a height of the first waveguide assembly is substantially equal to ¼ times a wavelength belonging to the radiation frequency band.

15. The antenna device according to claim 1, wherein the second waveguide assembly comprises:

a second conductor layer, located outside the case assembly and located next to the first side, wherein the second conductor layer has a fixed voltage; and a second cavity wall structure, located between the second conductor layer and the first side of the case assembly, and connecting the second conductor layer and the first side of the case assembly.

16. The antenna device according to claim 15, wherein the second cavity wall structure comprises a plurality of third conductor pillars separate from each other.

17. The antenna device according to claim 15, further comprising: a feeding portion, isolated from the second conductor layer and at least partially located within the second cavity wall structure.

18. The antenna device according to claim 1, further comprising: a feeding portion, located outside the case assembly and close to the first side, wherein a projection of the feeding portion to the first side is staggered from the slot, the slot extends along a direction, and a line connecting the projection of the feeding portion on the first side and a center of the slot is perpendicular to the direction.

* * * * *